Oct. 27, 1964 D. K. STEWART 3,154,275

JIG BOARD BRACKET

Filed Dec. 26, 1961

INVENTOR:
Dwight K. Stewart
By Willard M. Graham
Agent

United States Patent Office 3,154,275
Patented Oct. 27, 1964

3,154,275

JIG BOARD BRACKET

Dwight K. Stewart, Torrance, Calif., assignor to Northrop Corporation, Beverly Hills, Calif., a corporation of California Filed Dec. 26, 1961, Ser. No. 162,106
2 Claims. (Cl. 248—65)

My invention relates to brackets and more particularly to a novel and versatile article of manufacture for supporting items that normally come in lengths, such as wires, cables, lines and the like, in an overhanging position relative to a surface.

One embodiment of the bracket of my invention has been found extremely valuable in the manufacture of complex electronic systems such as computers for example wherein jig or harness boards are employed.

Wiring harnesses for large electronic systems often require harness boards more than 100 square feet in area. Efficient production of such huge harnesses usually requires setups in which any section of the board can be reached easily. Very often this is done by positioning the harness board vertically with respect to the floor.

Harness boards are usually made of plywood panels secured to slotted A-frames. Sections of the board may be cut out at harness locations requiring stripping and soldering work. Guide nails, used as posts, are then positioned in predetermined patterns around the area of the board in spaced apart pairs through which bundles of wires, are routed and supported for component placement, color coding, wire end preparation, terminal soldering, and checking inspection.

The guide nail head must be wrapped with masking tape to prevent tearing or fraying of the wire and cable insulation. Often masking tape used to wrap the nail heads is dislodged and becomes troublesome until it is repaired or replaced.

My bracket not only performs the above described function of the spaced posts, but also makes it impossible for bundles of elongated items routed therethrough to accidentally slip off or become dislodged from the board during work thereon.

After the work on the circuit items supported in my bracket is completed, it is very easy and simple to apply the harnesses or ties around the bundles of elongated items due to the way in which my brackets support the bundles in an overhanging position with respect to the board surface.

The bracket of my invention in other modified forms is useful for a variety of other purposes as will be hereinafter described.

It is an important object of my invention to provide a bracket for electronic harness boards which bracket is free of protuberances of any kind that could fray or damage the insulation on electronic circuit items.

It is a further object of my invention to provide a harness board bracket that will retain the circuit items routed therethrough in position regardless of the angular position of the board with respect to the floor.

It is another object of my invention to provide an article of manufacture that can be used for the temporary or even permanent support of electrical conduits, control cables, ropes, etc., wherein it is not necessary to have a free end of the item to pass through an eye or closed loop.

It is still another object of my invention to provide a bracket of extremely simple and economical construction within which electrical conduit, control cables, wires, rope and like articles can be quickly and easily confined for safe secure support, and within which the conduit, cable, or like articles can be as quickly and easily removed.

Briefly, in one preferred form, the bracket of my invent comprises a pair of arms supported on a base by vertical legs and positioned in spaced, parallel and overlapping relationship with respect to each other, the bracket being pivotally mounted so that the legs extend in generally horizontal directions relative to the surface on which the bracket is mounted. In one direction the arms of the bracket define between them a trough relative to elongated items lying therein. By rotation of the bracket through 90° the arms can be transversely positioned to completely encircle and confine the supported item.

The bracket will be more readily understood by reference to the appended drawings and detailed specification that follow.

Figure 1:
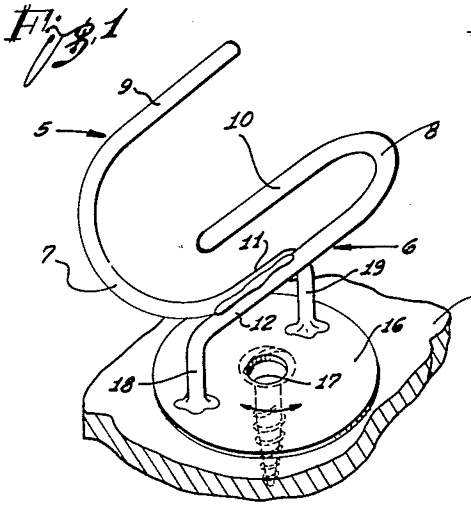
FIGURE 1 is a three-quarter view of one form of the bracket of my invention.

In FIGURE 1, a preferred form of the bracket of my invention is shown wherein a pair of relatively elongated U-shaped members 5 and 6, preferably made of a rigid material such as metal or plastic, are positioned parallel to each other with their bights 7 and 8 disposed opposite each other. For the sake of clarity, I shall refer to the vertical elements of my brackets as "legs" and to the horizontal elements as "arms" throughout the specification. The U-shaped members, in the vertical plane, are tilted outwardly relative to each other so that the upper arms 9 and 10 are spaced apart, while lower arms 11 and 12 abut each other. Lower arms 11 and 12 can be fastened together if desired.

The bracket can be adapted to be pivotally mounted on a surface 15 by means of a base 16 which is fastened to the surface 15 by a centrally located screw 17. In the particular embodiment shown U-shaped members 5 and 6 are positioned with the upper arms 9 and 10 extending in horizontal directions relative to the surface 15, being supported on the base 16 by legs 18 and 19 preferably being integral extensions of the abutting arms 11 and 12 of U-shaped members 5 and 6, bent downwardly at 90° angles, the lower end preferably being soldered, brazed, or otherwise joined with the base 16.

Figure 2:
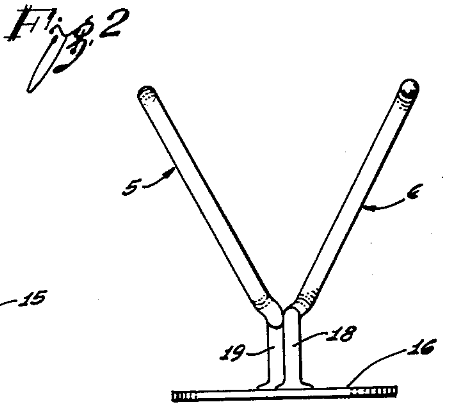
FIGURE 2 is an end view of the bracket shown in FIGURE 1.
Figure 3:
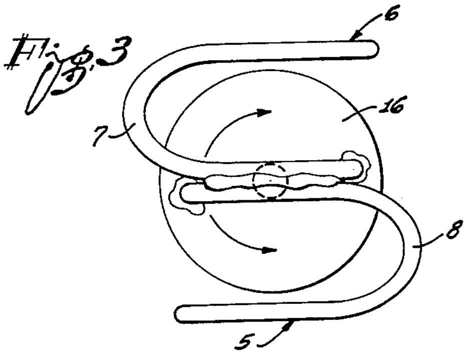
FIGURE 3 is a top view of the bracket shown in FIGURES 1 and 2.

By positioning U-shaped members 5 and 6, in the direction shown in FIGURES 2 and 3, there is defined between upper arms 9 and 10 a trough in which elongated items can be laid for support.

Figure 5:
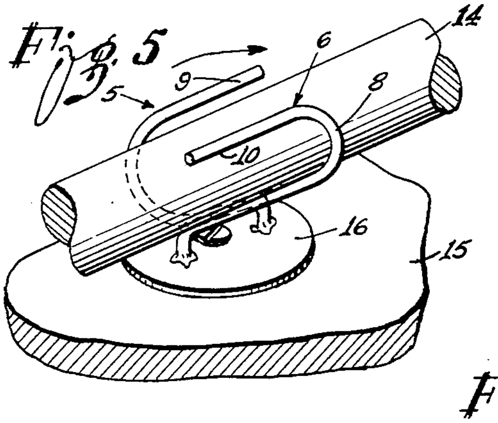
FIGURE 5 is a three-quarter view of the bracket shown in FIGURES 1, 2 and 3 in the trough position with respect to an item supported therein.
Figure 6:
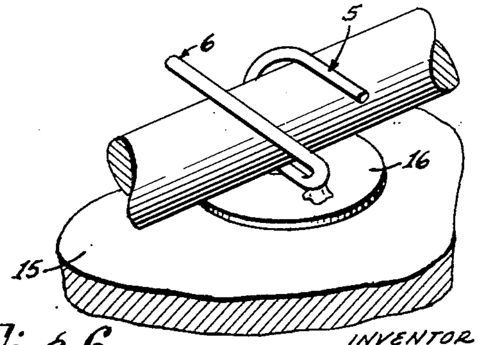
FIGURE 6 is a three-quarter view showing the relative position of the bracket and item of FIGURE 5 after the bracket has been rotated one-quarter of a turn.

Referring to FIGURE 5, an item or bundle of items, represented for clarity by a single cylindrical form 14 laid in the trough for support. If it is desired to confine the item or items 14 all that is necessary is to rotate the base 16 approximately 90°, or one-quarter of a turn, placing the upper arms 9 and 10 in a transverse direction relative to the axis of item 14 supported therein. In this manner item 14 is confined within the space defined between the arms 9 and 10 and bights 7 and 8 of the U-shaped members 5 and 6, above surface 15. In this position the harness board can be tilted to a substantially vertical position without disturbing the position of the items supported thereon. Moreover, harnesses or other tying means can be easily installed under and around the item 14 representing groups of wires or cables for example.

Thus it can be seen that the particular embodiment of my bracket described above with reference to FIGURES 1, 2, 3, 5 and 6 is ideally suitable for use on electronic harness boards.

Figure 4:
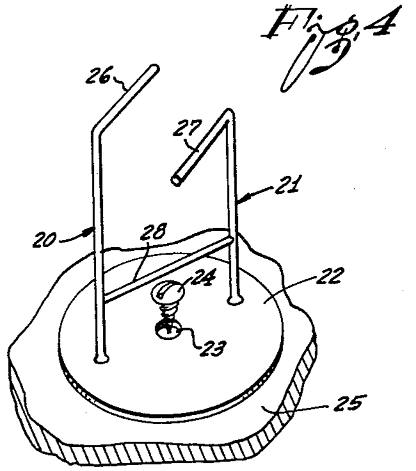
FIGURE 4 is a three-quarter view of another form the bracket of my invention can take.

Another embodiment of my invention is shown in FIGURE 4 wherein the ends of two spaced legs 20 and 21 are mounted on a base 22, having a central bore 23 and mounted to pivot around screw 24 on a surface 25, the legs 20 and 21 being bent to define spaced apart arms 26 and 27 extending parallel with each other in overlapping relationship in the same fashion as the form shown in FIGURES 1, 2 and 3. Near their bases, the legs 20 and 21 are preferably joined together with a crosstie 28 forming support for items placed therein.

The latter described bracket is highly useful for a variety of purposes, particularly for supporting control cables, electric lamp cords, drapery rods, etc., in an overhanging position relative to a surface.

While I have shown and described several preferred and practical forms of the bracket of my invention, other forms and equally practical embodiments of my invention will occur readily to those skilled in the art and it is foreseen that numerous departures utilizing equivalent structures may be made falling within the scope of my invention which is not limited to the details disclosed herein.

What is claimed is:

1. A bracket for supporting elongated items in an overhanging position relative to a surface comprising: a base mounted to rotate on said surface, a pair of spaced apart legs extending generally perpendicularly from said base, an arm extending at substantially a right angle from the outer end of each of said legs, said arms extending in parallel substantially overlapping relationship with each other so that in one direction said arms define between them an open trough over said surface and in a transverse direction a substantially enclosed space confining said elongated items, and a horizontal crosstie joining said legs together adjacent said base whereby said crosstie elevates said elongated item above said surface.

2. A bracket for supporting elongated items in an overhanging position relative to a surface comprising: a base rotatably fastened to said surface, a pair of spaced apart legs extending substantially perpendicularly from said base, a U-shaped arm extending at substantially a right angle from the outer end of each of said legs with the bights of said U-shaped arms disposed in parallel planes opposite each other, the free ends of said U-shaped arms extending in spaced apart parallel overlapping relationship so that between said arms there is defined in one direction an open trough for supporting said elongated items in an elevated position over said surface and in a transverse direction a substantially elongated enclosed space confining said elongated items.

References Cited in the file of this patent

UNITED STATES PATENTS

| | | |
|---|---|---|
| 792,594 | Hiss | June 20, 1905 |
| 1,381,219 | Newhall | June 14, 1921 |
| 1,381,231 | Pleister | June 14, 1921 |
| 1,546,839 | Klingel | July 21, 1925 |
| 1,595,728 | Pleister | Aug. 10, 1926 |
| 1,763,770 | Fish et al. | June 17, 1930 |